United States Patent [19]
Iwata

[11] Patent Number: 6,035,373
[45] Date of Patent: Mar. 7, 2000

[54] METHOD FOR REARRANGING DATA IN A DISK ARRAY SYSTEM WHEN A NEW DISK STORAGE UNIT IS ADDED TO THE ARRAY USING A NEW STRIPING RULE AND A POINTER AS A POSITION HOLDER AS EACH BLOCK OF DATA IS REARRANGED

[75] Inventor: Kunio Iwata, Yokohama, Japan

[73] Assignee: International Business Machines Corporation, Armonk, N.Y.

[21] Appl. No.: 08/859,304

[22] Filed: May 20, 1997

[30] Foreign Application Priority Data

May 27, 1996 [JP] Japan ..................................... 8-131927

[51] Int. Cl.⁷ ..................................................... G06F 11/20
[52] U.S. Cl. ............................... 711/114; 711/170; 714/6; 714/7
[58] Field of Search ..................................... 711/114, 170; 395/182.05; 714/6, 7

[56] References Cited

U.S. PATENT DOCUMENTS

| | | | |
|---|---|---|---|
| 5,502,836 | 3/1996 | Hale et al. ............................... | 711/170 |
| 5,517,632 | 5/1996 | Matsumoto et al. ..................... | 711/114 |
| 5,524,204 | 6/1996 | Verdoorn, Jr. ...................... | 395/182.04 |
| 5,615,352 | 3/1997 | Jacobson et al. ....................... | 711/114 |
| 5,758,118 | 5/1998 | Choy et al. .............................. | 711/114 |
| 5,809,224 | 9/1998 | Schultz et al. ..................... | 395/182.05 |

OTHER PUBLICATIONS

Artecon (Storage Dimensions) Press Release, "Storage Dimensions Introduces SuperFlex 3000 with DGR", entirety (pp. 1–3), Apr. 2, 1996.

*Primary Examiner*—Eddie P. Chan
*Assistant Examiner*—Hong Kim
*Attorney, Agent, or Firm*—Noreen A. Krall; Esther E. Klein

[57] ABSTRACT

In a disk array system, such as a RAID system, when disks are added thereto, this invention rearranges data without requiring a back-up of the stored data. When new data storage units are added into a RAID system in which each data storage unit is a row and an address range of the data storage unit is a column, a new striping rule dependant on the number of data storage units in the system, inclusive of newly added unit, is determined. Data are rearranged in the storage areas according to the new striping rule. In rearranging one row according to the new striping rule, the data involved in the transfer to one row from the other row, continues to be stored as a place holder block. Data that has been rearranged is accessed according to the new striping rule which data that has not been rearranged is accessed according to the old striping rule.

8 Claims, 6 Drawing Sheets

FIG. 1a
(Prior Art)

Original RAID

FIG. 1b
(Prior Art)

Newly composed RAID
(data parities are for new data blocks)

METHOD FOR REARRANGING DATA IN A DISK ARRAY SYSTEM WHEN A NEW DISK STORAGE UNIT IS ADDED TO THE ARRAY USING A NEW STRIPING RULE AND A POINTER AS A POSITION HOLDER AS EACH BLOCK OF DATA IS REARRANGED

FIELD OF THE INVENTION

The present invention relates to a data transfer method in a system comprising a plurality of storage units, such as a disk array system having parity data. More particularly, the present invention relates to a system and method for rearranging data and for accessing data stored in the system when a new storage units is added to such a system.

BACKGROUND OF THE INVENTION

In a data storage subsystem storing data for a computer system, throughput and reliability are important system requirements. A RAID (Redundant Array of Inexpensive or Independent Disks) system meets these requirements. Viewed from a host computer, a RAID system, having a plurality of hard disk drive devices (hereinafter, referred to as HDD), operates seemingly as if it were one HDD. A RAID system is characterized in that data and corresponding parity data are stored together to improve the reliability. That is, a common exclusive OR function of a set of data block is calculated and this calculated result is stored as parity data. When a failure occurs in one of the disks constituting the system, the presence of redundant data enables the data stored in the faulty disk to be reconstructed by calculating the exclusive OR of data stored in the other disks.

In a RAID system, a series of data transfers from a host computer are distributed and stored (arranged) on a plurality of HDDs in block units of a predetermined data length (hereinafter, referred to as a data block). Such a rule of distribution and arrangement of data is referred to as a striping rule. The number of HDDs comprising the system is a factor for determining the striping rule. Thus, when a user changed the number of HDDs comprising the system, data must be redistributed and rearranged according to a new striping rule. A change in the number of HDDs occurs typically when an HDD is added. Previously, when an HDD is added, data is rearranged on a plurality of HDDs in the system according to the following methods.

A first method is to rearrange the RAID system on the basis of the total number of HDDs after the addition. According to this method, first, a back-up of data is stored by the RAID system in an auxiliary storage (not the HDDs constituting the RAID system). After preparing the back-up, the RAID system is initialized and a striping rule based on the number of HDDs inclusive of the added HDDs is determined. Then, according to this striping rule, the back-up data is rearranged in the respective HDDs.

FIG. 1 is a diagram showing a change in the data block arranged in a two-dimensional (2-D) array when one HDD is added to a RAID system comprising 5 HDDs.

Referring to FIG. 1, data streams transferred from the host computer are divided into data blocks. Individual data blocks are written to four HDDs (drive 0 to drive 3) in sequence at the block unit (Block 0 to Block 3). And in the fifth HDD (drive 4), the exclusive OR of these data blocks (Block 0 to Block 3) (hereinafter, referred to as parity block) (Block P) is written. Row 0 comprises four data blocks (Block 0 to Block 3) and a parity block (Block P) which is the parity of these data blocks. As shown in FIG. 1(a), data blocks and the parity block of these data blocks are also written for the subsequent rows in the respective HDDs.

When the sixth HDD (drive 5) is added to the system, the data is backed up and thereafter the rearrangement is carried out in each HDD of the initialized system at the block unit. Since the number of blocks in Row 0 increases by one (Block 0' to Block 4'), parities of data in the five blocks are newly calculated to determine a parity block (Block P'). In a similar manner, rearrangement of data blocks and calculation and arrangement of a parity block are repeatedly executed for Row 1 and the subsequent rows (FIG. 1(b)).

The second method is to newly construct a RAID system with added HDDs, separate from the RAID before the modification.

FIG. 2 is a diagram showing changes in the data blocks arranged in a 2-D array using the second method when three HDDs are added to a RAID system comprising 5 HDDs. Independently of the RAID (FIG. 2(a)) comprising 5 HDDs (drive 0 to drive 4), a RAID is constructed with three newly added HDDs (drive 5 to drive 7) (FIG. 2(b)) and this additional part is made accessible as a separate logical unit according to a different striping rule.

Such conventional methods have the following problems. In the first method, to newly reconstruct the RAID including the added HDDs, the host computer cannot access this system when data has been erased and the system is initialized. Since RAID systems are required to be always available, the initialization of the RAID system causes a serious problem. In addition, because an auxiliary storage of large capacity is necessary for the back-up of data, the cost becomes high.

In the second method, since the RAID is divided into two or more systems, the performance of the system is lowered compared to a single RAID system having the same number of HDDs for two reasons. First, the larger the number of HDDs constituting the RAID, the smaller the amount of HDD accesses per HDD due to the distribution of data. In the example of FIG. 2, the data performance is higher for a RAID system comprising 8 HDDs collectively than for two RAID systems comprising respectively 5 HDDs and 3 HDDs. Another problem with this second method is that it is complicated to control a plurality of RAID system which lowers performance.

Thus, it is a first object of the present invention to provide a method enabling a new storage device to be added to a system without having to erase the data stored in the system.

It is a second object of the present invention to prevent the lowering of system performance even when the constitution of the system is modified by the addition of a new storage devices to the system.

SUMMARY OF THE INVENTION

The present invention overcomes one or more of the foregoing problems and achieves one or more of the foregoing objectives. According to a first preferred embodiment, a data storage system comprises a plurality of data storage units, each storing a plurality of data blocks and parity blocks according to a striping rule that is a function of the number of data storage units. The arrangement of data blocks and parity blocks on the storage units can be represented by a 2-D array comprising rows and columns, where each column corresponds to the respective data storage unit, while each row corresponds to the address range of a data storage unit. By specifying a row and a column, the address range in a particular drive can be identified. When increasing the number of data storage units constituting such a system by adding new data storage units to the system, the rearrangement of data stored in the system is achieved by the following steps:

(a) Determining a new striping rule as a function of the number of data storage units in the system including the newly added data storage unit;

(b) Rearranging the respective data blocks related to one row of said 2-D array according to the new striping rule;

(c) Creating a parity block from the plurality of data blocks rearranged in the one row; and (d) Arranging the created parity block in the storage regions belonging to said one row in accordance with the new striping rule.

In said step (b), when the rearrangement relating to one row is performed, a placeholder block having the same content as those of the data block transferred to said one row from another row continues to be stored in the other row as a copy block of the data.

It is preferable that the aforesaid copy block continues to be stored in the storage region belonging to the other row; viz., in the position where it was originally arranged.

It is preferable to execute steps (b) to (d) for other rows and to keep storing the aforesaid copy block until the rearrangement for the other row begins.

It is preferable for this data storage system to identify the striping rules for each data block during the rearrangement process using a pointer for indicating the completion status of a data block. For this purpose, a value of a pointer is updated in response to the rearrangement of data blocks.

A second preferred embodiment of the invention is to provide a data access method when an access request takes place from the host computer to a data storage system comprising a plurality of data storage units. In each data storage unit, a data block or a parity block for parities of data blocks is stored according to a first striping rule as a factor of the number of storage units. When a new data storage unit is added to the data storage system, the storage system rearranges the data blocks in the respective data storage units according to a second striping rule as a factor of the number of storage units inclusive of the newly added data storage unit. During the progress of this rearrangement, if an access request takes place from outside the data storage system, a method for accessing data comprises the following steps.

The data storage system has a pointer for indicating the completion status of data block rearrangement. The system updates a value of said pointer in response to the rearrangement of data blocks to indicate up to which data block the rearrangement has been completed. The pointer is used to discriminate whether data to be accessed are arranged according to said first striping rule or said second striping rule. If data to be accessed include both a first data block arranged according to said first striping rule and a second data block arranged according to said second striping rule, the system accesses said first data block according to said first striping rule and said second data block according to said second striping rule.

If data to be accessed include only either the first data block or the second data block, it is only necessary to access according to the respective striping rule.

A third preferred embodiment of the invention is a data storage system comprising a data bus, a plurality of data storage units for storing data, and a plurality of connecting means and parity creating means. The respective connecting means are provided between the respective data storage units and the aforesaid data bus. The parity creating means, connected to the data bus, evaluates the parity of data. This data storage system further comprises system control means. The system control means controls the system as follows.

According to a new striping rule determined by the number of data storage units inclusive of the newly added data storage unit, a plurality of data blocks from one row of a 2-D array are individually rearranged in the respective storage areas belonging to the one row. Then, a parity block is newly created from the plurality of data blocks rearranged in the respective storage areas belonging to the one row. The created parity block is arranged in a storage area belonging to the one row according to the new striping rule. When the rearrangement concerning one row is performed according to the new striping rule, the same data as those of the data block to be transferred to one row from the other row keeps being stored as a placeholder copy block.

It is preferable to continue to store this placeholder block in storage areas belonging to the other row (the transfer origin for the data to be transferred to the one row). Also, when the rearrangement concerning other rows than the one row is repeatedly executed, it is preferable to continue storing the placeholder block without replacing it with other data until the rearrangement for these other rows begins.

Furthermore, it is preferable for this data storage system to identify up to which data block the rearrangement has been completed by using a pointer for indicating the completion status of the data block rearrangement. The value of the pointer is successively updated in response to the rearrangement of further data blocks.

A fourth preferred embodiment of the invention is a data storage system comprising a data bus, a plurality of data storage units for storing data, a plurality of connecting means each provided between the respective data storage unit and the aforesaid data bus and further parity creating means connected to the data bus for calculating the parity of data. This data storage system further comprises system control means, which controls the system as follows.

According to a first striping rule dependant on the number of data storage units, data stored in the system are in a data storage area for each data block. At this time, a parity block is calculated for the data blocks of each row. When new data units are added, the data storage system rearranges data in the system according to a second striping rule dependent on the number of data storage units inclusive of newly added data storage units, different from the first striping rule. That is, the data that have already been stored are rearranged on the data storage units. To satisfy a data access request received from outside the data storage system during the rearrangement process, the data storage system has a pointer indicating the completion status of the data block rearrangement. A value of this pointer, serves to identify up to which data block the rearrangement has been completed. It is discriminated by reference of this pointer whether data to be accessed are arranged according to the first striping rule or the second striping rule. If data to be accessed comprise a first data block arranged according to the first striping rule, an access is made according to the first striping rule. Otherwise, if data to be accessed comprise a second data block arranged according to the second striping rule, an access is made according to the second striping rule. Furthermore, if data to be accessed include both a first data block arranged according to said first striping rule and second data block arranged according to said second striping rule, an access is made to the first data block according to the first striping rule and to second data block according to the second striping rule.

BRIEF DESCRIPTION OF THE DRAWINGS

FIG. 1 is a schema showing changes in data blocks arranged in a 2-D array according to a first conventional method;

DETAILED DESCRIPTION OF THE INVENTION

Figures 2A, 2B:
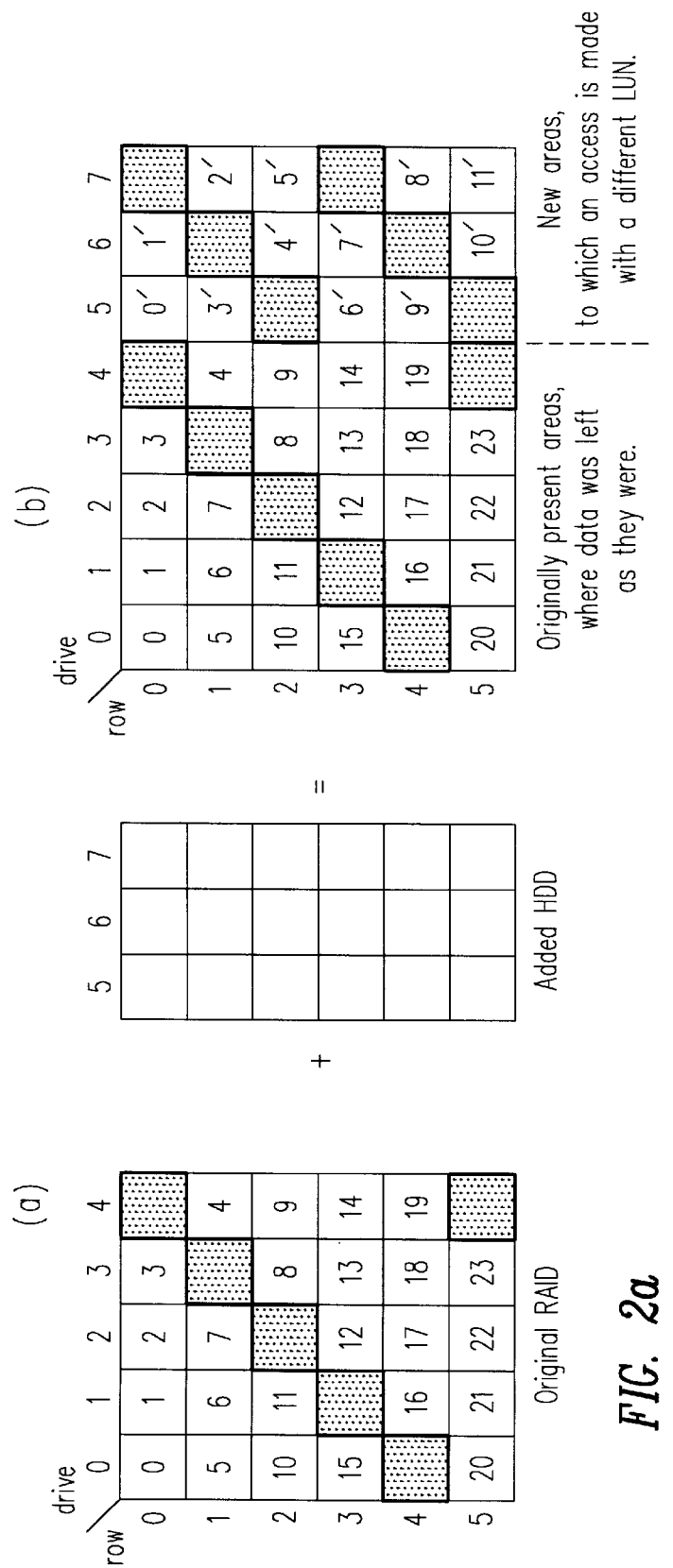
FIG. 2 is a schema showing changes in data blocks arranged in a 2-D array according to a second conventional method.
Figure 3:
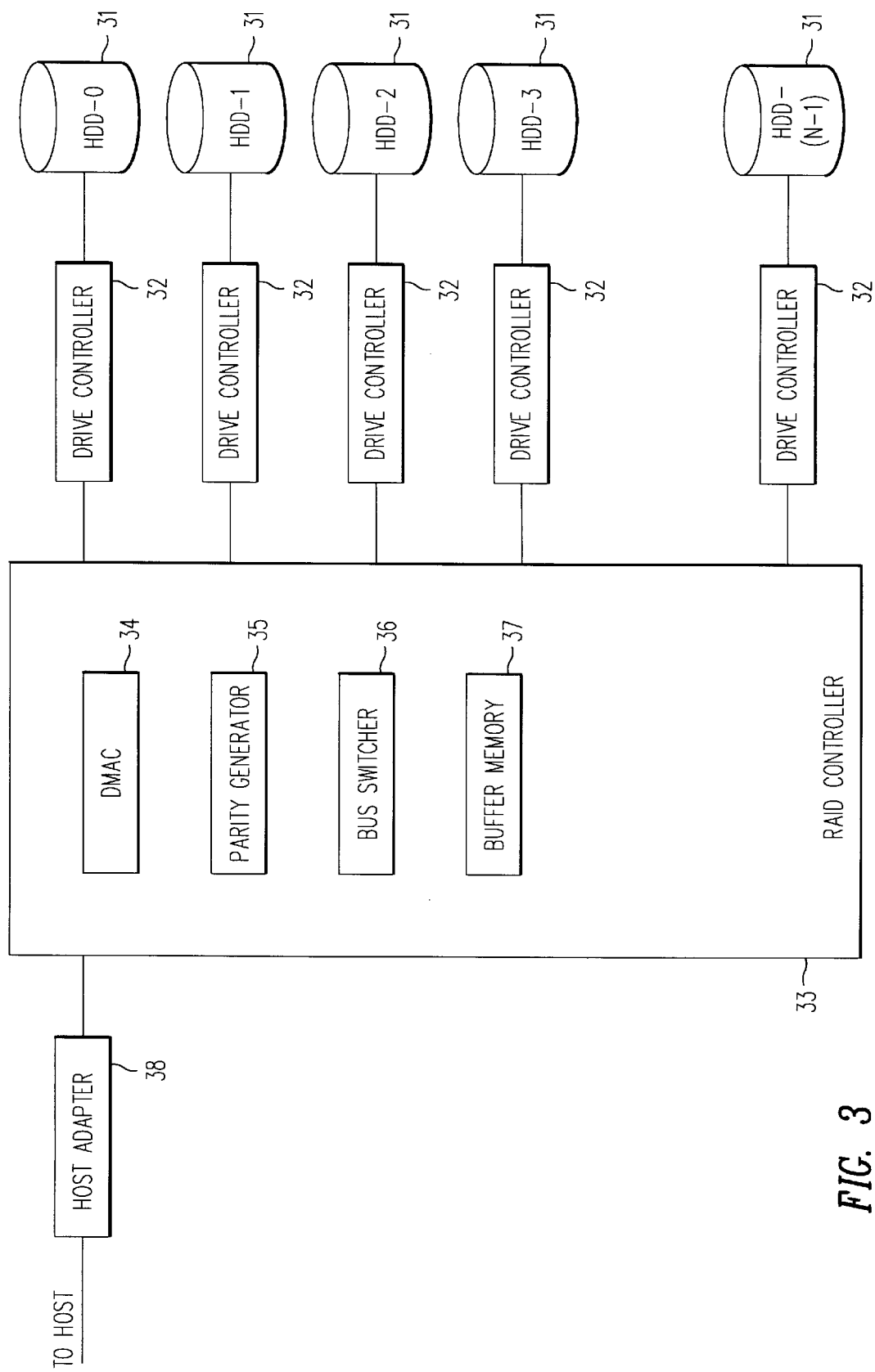
FIG. 3 is a block diagram of a data storage system according to a preferred embodiment of the present invention.

FIG. 3 is a block diagram of a data storage system comprising N (N≧3) HDDs. Hereinafter, this data storage system will be described on the basis of a system called RAID 5 as a typical example, but the present invention is not limited to this and is naturally applicable to a RAID 3 and other various systems known to those skilled in the art.

HDDs 31 are connected via drive control circuits 32 as connecting means to a RAID control circuit 33 as system control means. The drive control circuit 32 is a circuit for connecting the HDDs 31 and a data path (not shown). The RAID control circuit 33 is a control circuit for controlling the whole RAID system by controlling the transfer timing to the data path in response to a signal or the like from the host or creating parity data. This RAID control circuit 33 comprises a DMAC (Direct Memory Access Control circuit) 34, a parity generator circuit 35, a path switch circuit 36 and a buffer memory 37. The parity generator circuit 35 is a circuit for calculating the parity by performing an exclusive OR operator on input values. These input values are data on the data path or data in the buffer memory 37. The data path is connected via a host adaptor 38 to a host computer (not shown).

In this system, the data stream transferred from the host computer is divided into block units of a predetermined data length according to a striping rule based on the number of HDDs constituting the RAID system, and stored in the respective HDDs for each block.

When a user adds at least one HDD into the system, the RAID control circuit 33 functions to control the procedure for appropriately rearranging the data stored by the system after this modification as an additional function. This characteristic of the control circuit will be described later.

First, the striping rule will now be described. The striping rule determines the manner for arranging the data blocks in a predetermined number of HDDS. The striping rule used in FIG. 1(b) shows data arranged in six storage units according to the Left Symmetric rule. In the present specification, the striping rule is defined as based not only on the allotting manner of allocating the data, such as the left symmetric rule, but, also on the number of HDDs. In other words, it is to be especially noted that even if the manner of allocating the data is the same left symmetric rule, the striping rule differs for a different number of HDD.

Figure 4:
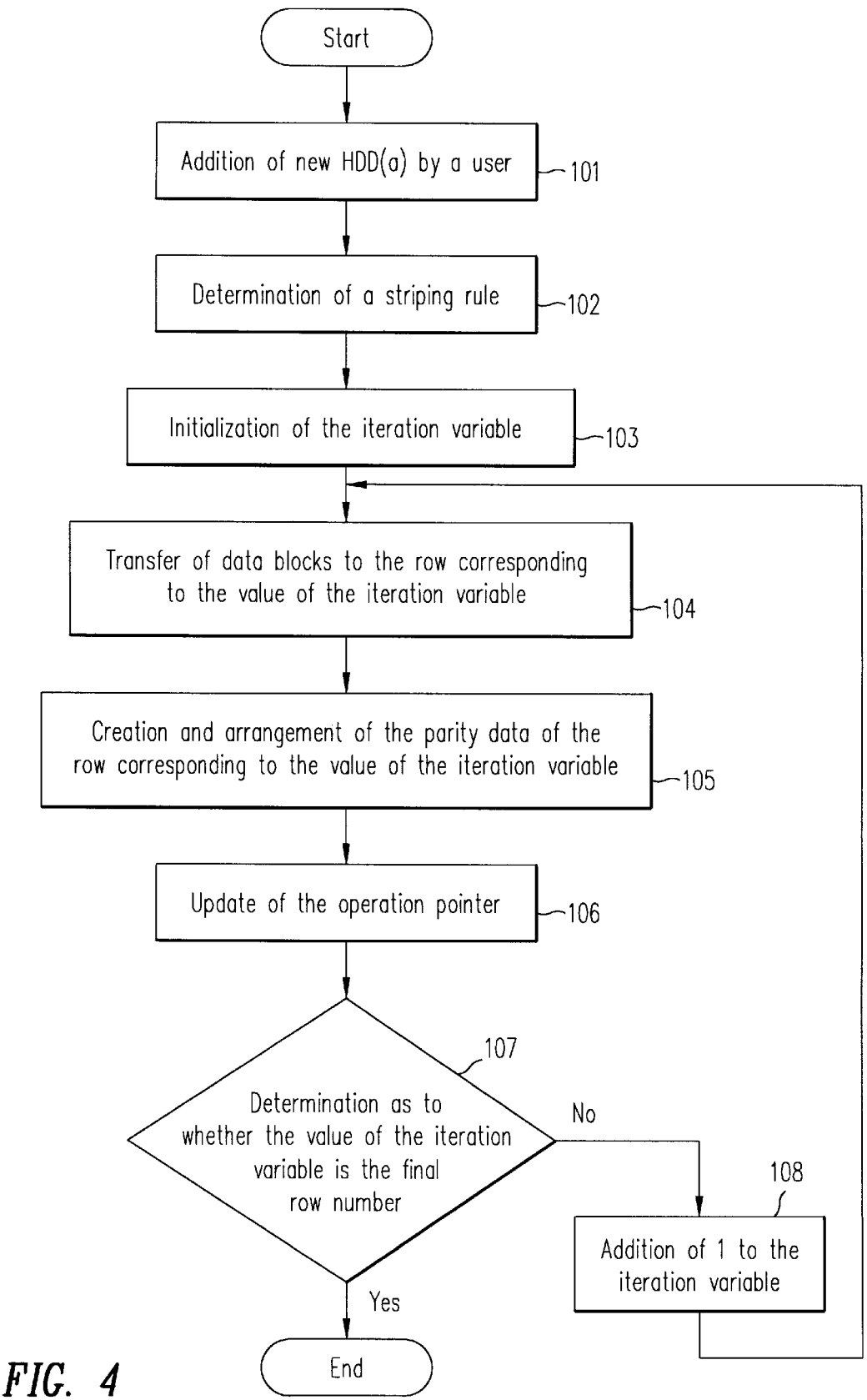
FIG. 4 is a flow chart of the rearrangement of stored data when an HDD is added to a data storage system according to a preferred embodiment of the present invention.
Figure 5:
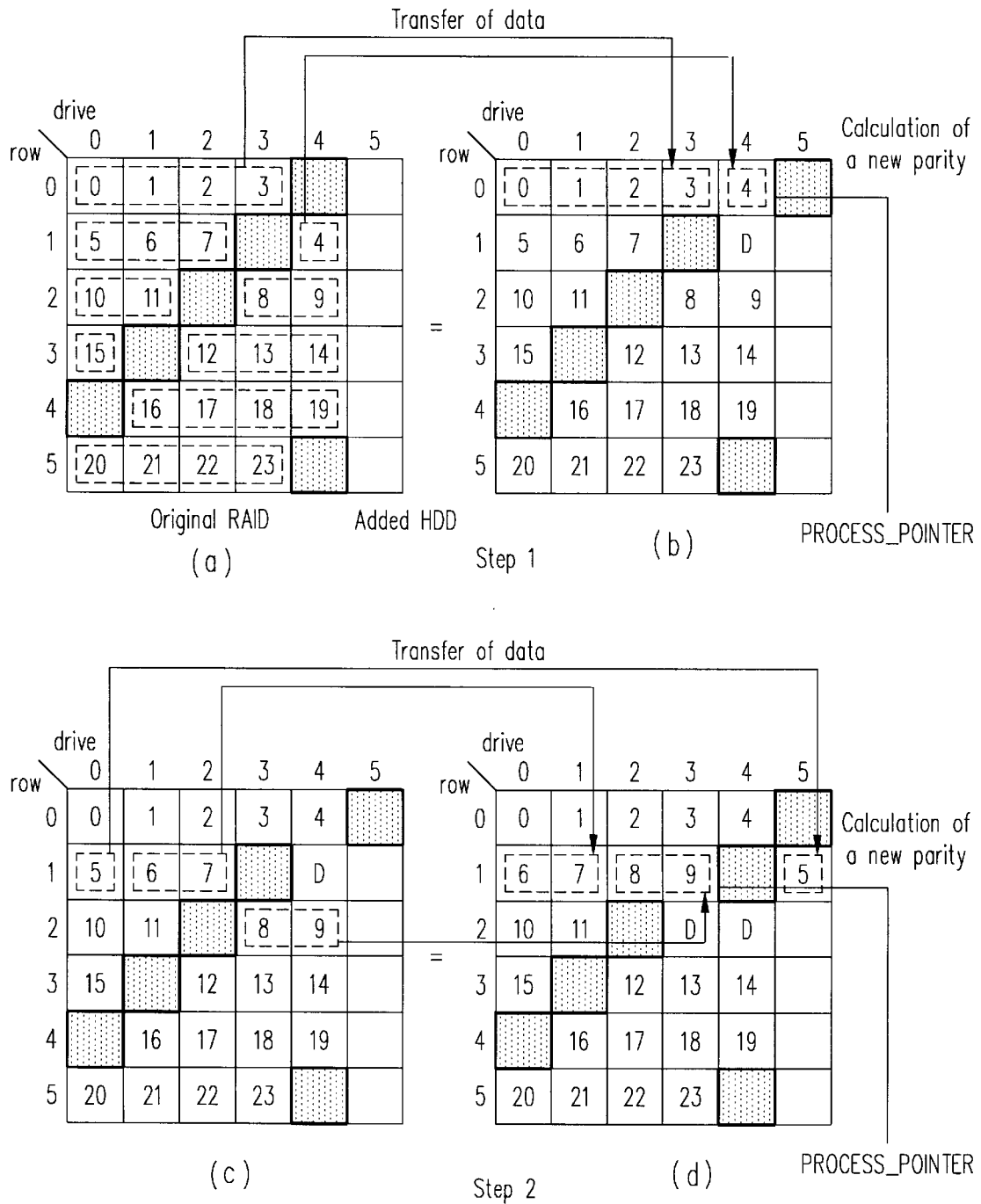
FIG. 5 is a schema showing changes in data blocks arranged in a 2-D array according to a preferred embodiment of the present invention.

FIG. 4 shows a flow chart for the rearrangement of data blocks in a case where a HDD is newly added to a data storage system according to the preferred embodiment. FIG. 5 is a schema showing changes in the data blocks arranged in a 2-D array according to this embodiment. These steps are executed under control of the RAID control circuit 33.

Each row of the 2-D array shown in FIG. 5 corresponds to a predetermined range of logical addresses of a certain HDD. For example, Row 0 corresponds to the range of logical address A to logical address B. And each column of the 2-D array corresponds to the respective serial number of an HDD. Thus, when a certain row and column are specified, an address area in an HDD is defined in terms of the storage range of the system. An ordinal number in the matrix denotes the serial number of a data block and P denotes a parity block calculated as the exclusive OR of four data blocks belonging to one and the same row.

Addition of a New HDD by a User (Step 101)

Into a RAID system comprising 5 HDDs (HDD 0 to HDD 4) to which the left symmetric rule is applied, a user adds another HDD (HDD 5). To be specific, a user inserts HDD 5 into the drive bay of a device. When HDD 5 is normally inserted, a signal indicating that an HDD was added is transmitted to the RAID control circuit 33. This embodiment shows a case where one HDD is added, but the present invention is naturally applied also to a case where a plurality of HDDs are added.

Determination of a New Striping Rule (Step 102)

Based on six HDDs (HDD 0 to HDD 5) inclusive of the added HDD, the RAID system is considered to be modified. Corresponding to a change in the number of HDDs, the striping rule is also modified and the setting is so modified that the arrangement of data is distributed to 6 HDDs according to the left symmetric rule. FIG. 5(a) shows the arrangement status of data directly after the modification of the system. Since the data blocks and parity blocks are arranged according to the striping rule based on the number of HDDs before the modification, none of data are written in the added HDD (HDD 5).

Initialization of a Iteration Variable (Step 103)

In executing the rearrangement of data blocks, first, an iteration variable is initialized (row_new=0). This iteration variable represents a row number after the modification of a system, and denotes Row 0 at the initial state. The rearrangement of data is executed with a value of this iteration variable set to be the row in which the rearrangement is executed.

Transfer of Data Blocks to the Row Corresponding to a Value of the Iteration Variable (Step 104)

According to the newly determined striping rule, the rearrangement is executed concerning the row of ordinal number corresponding to a value of the iteration variable (row_new). In the plurality of storage areas belonging to this row (the respective storage areas are identified by rows and columns of a 2-D array), the respective data blocks are rearranged. FIG. 5(b) shows the completed state of rearrangement in Row 0 alone. The data blocks 0 to 3 that have been arranged in Row 0 since before the modification remain unchanged in the previous storage areas. Then, the subsequent data block 4 is transferred from Row 1 to Row 0 and rearranged in the HDD 4. In the present invention, the rearrangement of data does not necessarily require that all data never fail to be transferred to other storage areas.

In transferring data blocks according to the new striping rule, a placeholder block D having the same data as those of a data block changing its row is left in the original storage area. With respect to the data block 4, for example, since the row in which it is arranged changes from Row 1 to Row 0, a placeholder block D having the same data as those of the data block 4 is left in the original storage area (HDD 4 in Row 1).

The reason why the placeholder block D is left in the transfer origin is to ensure that data can be reconstructed even during the process of rearrangement. For example, if the HDD 2 failed during the process of data rearrangement, the data block 7 stored in HDD 2 would need to be reconstructed. The placeholder block D left in the transfer origin (e.g., Row 1 for the data block 4), the data block 7 can be reconstructed by calculating the exclusive OR of the parity data P of Row 1 and the data blocks 5, 6, and the placeholder block D.

Creation and Arrangement of Parity Data of the Row Corresponding to a Value of the Iteration Variable (Step 105)

In the row corresponding to a value of the iteration variable, the plurality of data blocks are rearranged. By calculating the exclusive OR of all data blocks belonging to this row, a new parity block P' is calculated. This new parity block P' is replaced with the conventional parity block P. For Row 0, a parity block P is created from the data blocks 0 to 4 and stored in the storage area in which the preceding parity block P is stored. This exclusive OR is performed by the parity generator circuit 35.

Meanwhile, in a case where the data block in an area in a certain row was rewritten by an access from the host computer during the progress of data rearrangement, a parity block P needs to be newly calculated from the data blocks belonging to the relevant row (data of the placeholder block is taken into consideration when there is a placeholder block D). When the data block 6 of Row 1 is rewritten by an access from the host computer, for example, the exclusive OR of the data blocks 5 to 7 and the placeholder block D is calculated to update the parity block P of Row 1.

Update of a Operation Pointer (Step 106)

By using an operation pointer for indicating the completion status of data block rearrangement, the present system is able to indicate for which row and data block the rearrangement of data blocks has been completed. Then, in response to the completion of a data block rearrangement, the value of the operation pointer is successively updated. When a data access takes place from the host computer, using this operation pointer, it can be determined whether the data to be accessed is before or after the point where the rearrangement has been completed. When a data access request is received from the host computer, data is processed according to the striping rule before the modification if the data to be accessed is stored in the storage areas before where the operation pointer points. On the other hand, data is processed according to the new striping rule, if the data to be accessed is stored in the storage areas after the operation point. This concept will be more fully described later.

Determination as to Whether a Value of the Iteration Variable is the Final Row Number (Step 107)

Determination is made as to whether the iteration variable meets the following equation:

[Equation 1]

$$\text{row\_new} = \text{row\_new\_max},$$

where row_new: loop variable; and row_new_max last column number.

Here, the final row number (row_new_max) is defined by the following equation:

[Equation 2]

$$\text{row\_new\_max} = [((m-1)(\text{row\_max}+1))/(n-1)],$$

where

[ ]: Gauss' notation m: number of HDDs constituting the RAID before the modification row_max: maximum number of rows in the RAID before the modification n: number of HDDs constituting the RAID after the modification When the above equation is satisfied, viz., when the rearrangement of data is completed till the last column, the rearrangement of data ends.

When the above equation is not satisfied, 1 is added to the iteration variable (row_new) (Step 8) and processing returns to Step 4 thereafter. FIGS. 5(c) and (d) shows the prior and subsequent circumstances of data rearrangement in Row 1 when the iteration variable is 1(row_new=1). In FIGS. 5(c) and (d), a new parity block P' is calculated from the data blocks 5 to 9 and stored in the HDD 4. It is to be noted that the placeholder blocks D of data blocks 8 and 9 are left in the HDD 3 and HDD 4 of Row 2, their transfer origins.

In this manner, starting with Row 0, once data blocks are arranged in a row of the RAID system after modification, then the corresponding parity blocks are calculated and arranged. By repeating this procedure till the end row, the rearrangement is completed.

During the time data in a row is being arranged, when a request is received from the host computer to access data blocks, the following process will be carried out in accordance with the relation between the data region to be accessed and an operation pointer. This processing is controlled and executed on the basis of the RAID control circuit 33.

(1) When the data to be accessed are present in areas preceding the operation pointer:

the RAID control circuit 33 makes an access according to the new striping rule because areas preceding the operation pointer are where the rearrangement has been completed.

(2) When the data to be accessed are present in areas following to the operation pointer:

the RAID control circuit 33 makes an access according to the former striping rule because areas following the operation pointer are where the rearrangement has not been completed yet.

(3) When the data to be accessed are present in areas extending over the operation pointer:

viz., when the data to be accessed include areas preceding to and ones following the operation pointer, the data to be accessed include both data blocks arranged according to the new striping rule and ones arranged according to the conventional striping rule. Consequently, the RAID control circuit 33 processes the commands given by the host computer divisionally. Specifically, an access is made to data present in areas following the operation pointer according to the new striping rule and to data present in areas preceding to the operation pointer according to the former striping rule, respectively.

Figure 6:
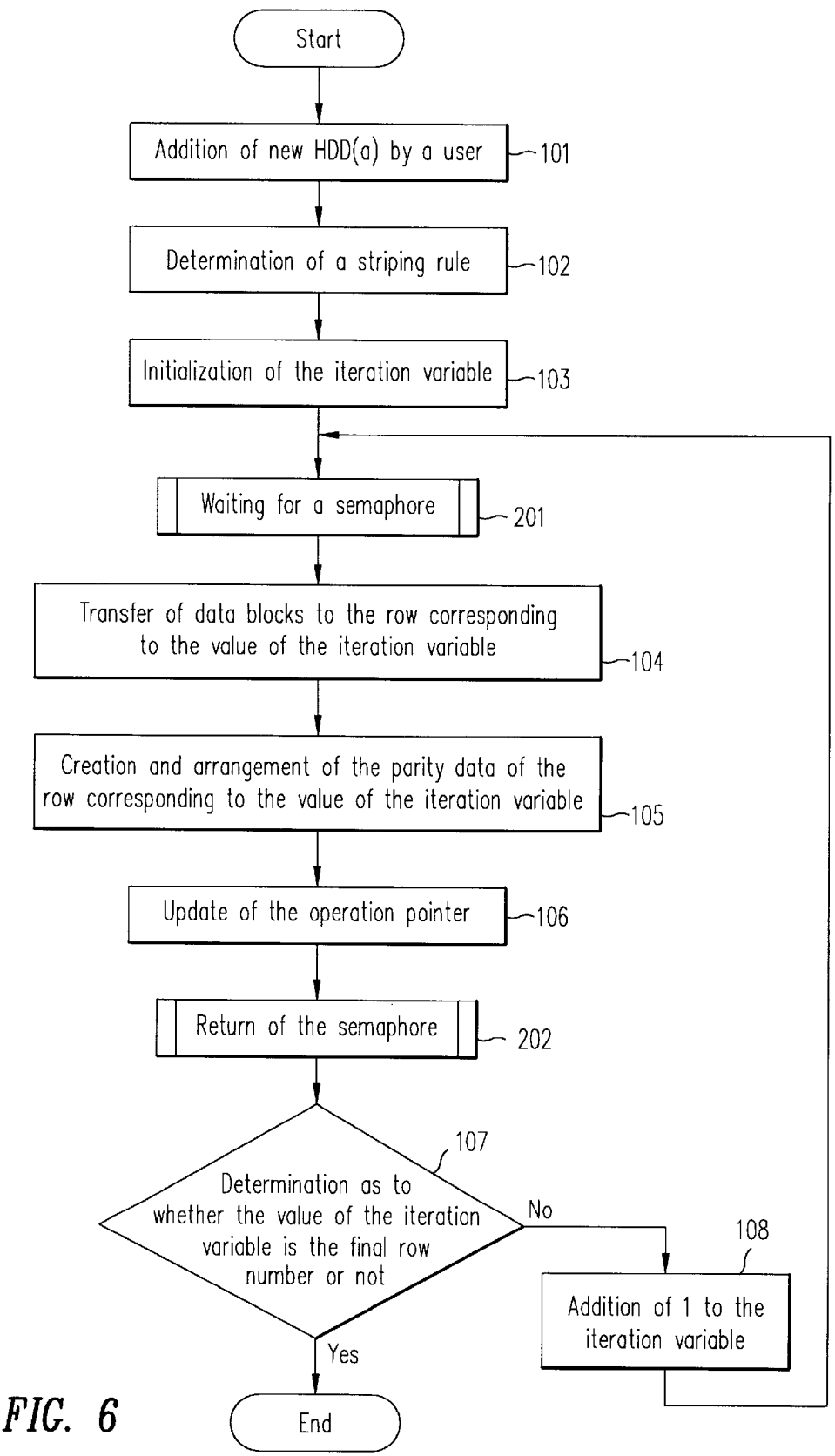
FIG. 6 is a flow chart of the rearrangement of stored data when an HDD is added to a data storage system according to second preferred embodiment of the present invention.

Hereinafter, a second preferred embodiment will be described. With the second preferred embodiment, the configuration of a system is also as in FIG. 3. FIG. 6 is a flow chart for the rearrangement of data blocks in a case where a HDD is added to a data storage system according to the second preferred embodiment. This embodiment allows for cases where an access from the host computer is admitted while a RAID system is executing the rearrangement operations. In FIG. 6, the steps are the same as in the first preferred embodiment that were previously described and have the same reference numbers. The description will not be repeated here.

The second preferred embodiment is characterized in that the rearrangement task and a task for the command processing from the host computer are separated by using a semaphore and excluded from each other. Here, the semaphore is a mechanism provided by a multitask operating system (OS) for the mutual exclusion between tasks. When processing both the data rearrangement and an access command from the host computer, there is a need to apply the correct striping rule. The procedure proceeds so that the semaphore-acquired processing is executed with priority and the others are temporally stopped. To be more specific, the system requests the acquirement of a semaphore to the OS before entering the processing of data rearrangement. In answer to this request, unless a semaphore is acquired by another task, the OS gives a semaphore to the rearrangement task. If a semaphore has already been acquired by another process, the rearrangement is paused until returned.

Concretely, as shown in FIG. 6, the rearrangement of data is conducted for each row and "Waiting for a semaphore (Step 201)" and "Return of the semaphore (Step 202)" are executed every time. In that way, an access to the disk. by a command processing task is forbidden while a certain row is rearranged, thereby ensuring that the rearrangement of a certain row is accurately carried out according to a striping rule.

The above-mentioned embodiments are described with respect to a HDD, but the present invention is not limited to this and applicable to other disk drive devices using an optical disk such as MO, DVD and PD, a device using a semiconductor memory card, etc., as is known to those skilled in the art.

According to the present invention, the number of data storage units can be increased without requiring the back-up of stored data. In addition, after the completion of data rearrangement, a system including the newly added data storage units can be composed. Thus, the load per data storage unit can be reduced and the performance of data accesses can be improved.

I claim:

1. In a data storage system comprising a plurality of data storage units, each unit storing a plurality of data blocks and a plurality of parity blocks according to a striping rule dependent on the number of storage units, wherein the arrangement of data can be represented by a 2-D array comprising rows and columns, each column corresponding to a respective one of said data storage units and each row corresponding to an address range of said data storage units and each storage area is specified by a row and a column, a method for rearranging data when at least one new data storage unit is added to said system, comprising the steps of:

(a) determining a new striping rule dependant on the number of said data storage units in the system including the newly added data storage unit;

(b) rearranging the respective data blocks for a row of said array by transferring at least one data block from another row according to said new striping rule wherein, all data blocks needed to create the row are transferred together and wherein, the data block transferred to said one row from the other row, continues to be stored in the other row as a copy data block until rearrangement of said other row is begun, such that update access to all data blocks of said other row can continue during rearrangement of said one row and such that said copy data block is used to reconstruct a lost data block in said other row;

(c) creating a new parity block from the plurality of data blocks rearranged in individual storage areas belonging to said one row at the same time that the at least one data block is transferred from the other row; and (d) arranging the created parity block in the storage areas belonging to said one row according to said striping rule.

2. The method for rearranging data as set forth in claim 1, further comprising the step of:

(e) executing steps (b) to (d) for other rows than said one row, wherein each data block keeps being stored in its original location until the rearrangement for said other rows.

3. The method for rearranging data as set forth in claim 1, wherein said data storage unit is a hard disk drive device.

4. The method for rearranging data as set forth in claim 1, wherein said data storage system identifies up to which data block the rearrangement has been completed using a pointer indicating the completion status of the data block rearrangement.

5. The method for rearranging data as set forth in claim 4, further comprising the step of:

updating a value of said pointer in response to the rearrangement of data blocks.

6. In a data storage system comprising a plurality of data storage units, each storing a plurality of data blocks and a plurality of parity blocks according to a first striping rule based on an allotting manner of allocating data blocks and dependant on the number of data storage units, wherein when a new data storage unit is added to said system, said data storage system rearranges data blocks and parity blocks according to a second striping rule based on an allotting manner of allocating the data blocks and dependent on the number of storage units inclusive of the newly added data storage unit, a method for accessing data stored in said data storage system comprising the steps of:

(a) providing a pointer indicating a completion status of the data block rearrangement;

(b) updating a value of said pointer in response to the rearrangement of data blocks so that said pointer indicates up to which data block the rearrangement has been completed;

(c) using said pointer to determine whether data to be accessed are arranged according to said first striping rule or said second striping rule; and (d) when data to be accessed include both a first data block arranged according to said first striping rule and a second data block arranged according to said second striping rule, accessing said first data block according to said first striping rule and said second data block according to said second striping rule.

7. An article of manufacture for use in a data storage system comprising a set of storage units, each storage unit comprising a plurality of storage areas having data blocks and parity blocks striped across the set of storage units, according to a striping rule, wherein at least one storage unit is added to the set to create an expanded set of storage units;

said article of manufacture comprising a computer readable storage medium having a computer program code embodiment in said medium which causes the data storage system to:

(a) determine a new striping rule dependant on the number of storage units in the expanded set;

(b) rearrange the data blocks stored in a first address range on each of the storage units in the expanded set by transferring at least one data block from a second address range, such that the data blocks in said first address range are arranged according to the new striping rule, wherein at least one data block continues to be stored in the second address range as a copy data block until rearrangement of said second address range is begun, such that update access to all data blocks of said second address range can continue during rearrangement of said first address range and such that said copy data block can be used to reconstruct a lost data block in said second address range;

(c) creating a new parity block from the plurality of data blocks rearranged in individual storage areas belonging to said first address range; and (d) arranging the created parity block in the storage areas belonging to said first address range according to said striping rule.

8. The article of manufacture as in claim 7, wherein said medium further causes the data storage system to:

identify up to which data block the rearranging has been completed using a pointer indicating the completion status of the data block; and update a value of said pointer in response to the rearrangement of data blocks.

* * * * *